United States Patent
Zhang et al.

(10) Patent No.: US 8,152,446 B2
(45) Date of Patent: Apr. 10, 2012

(54) APPARATUS AND METHOD FOR REDUCING ECCENTRICITY AND OUT-OF-ROUNDNESS IN TURBINES

(75) Inventors: Hua Zhang, Greer, SC (US); Kenneth Neil Whaling, Simpsonville, SC (US); Jason Allen Seale, Simpsonville, SC (US); Dean Matthew Erickson, Simpsonville, SC (US); Michael Francis Michalski, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1114 days.

(21) Appl. No.: 11/843,926

(22) Filed: Aug. 23, 2007
(Under 37 CFR 1.47)

(65) Prior Publication Data
US 2009/0053035 A1    Feb. 26, 2009

(51) Int. Cl.
*F01D 25/26* (2006.01)
(52) U.S. Cl. .................................. 415/108; 415/175
(58) Field of Classification Search .............. 415/108, 415/175
See application file for complete search history.

(56) References Cited

U.S. PATENT DOCUMENTS

| | | | | |
|---|---|---|---|---|
| 5,116,199 A | * | 5/1992 | Ciokajlo | 415/173.2 |
| 5,212,940 A | * | 5/1993 | Glover | 60/782 |
| 5,281,085 A | * | 1/1994 | Lenahan et al. | 415/173.2 |
| 7,309,209 B2 | * | 12/2007 | Amiot et al. | 415/173.2 |
| 7,798,767 B2 | * | 9/2010 | Kondo et al. | 415/108 |

FOREIGN PATENT DOCUMENTS

JP          06117204 A  *  4/1994
JP       2002285803 A  * 10/2002

OTHER PUBLICATIONS

JP 06-117204 A. Japanese Patent Office Machine Translation. Accessed Jan. 20, 2011.*
JP 2002-285803 A Machine Translation. Accessed JPO website Apr. 19, 2011. pp. 1-9.*
U.S. Appl. No. 11/548,791. "Turbine Case Impingement Cooling for Heavy Duty Gas Turbines". filed Oct. 12, 2006. 16 pages.

* cited by examiner

*Primary Examiner* — Richard Edgar
(74) *Attorney, Agent, or Firm* — Cantor Colburn LLP

(57) ABSTRACT

A turbine includes: a plurality of turbine blades arranged within a casing, the arrangement including a clearance between tips of the blades and the casing; a plurality of manifolds disposed proximate to the casing opposite the clearance, wherein each of the manifolds includes a plurality of impingement holes in the surface thereof; a source of clearance information; and a source of cooling air for supplying cooling air through a plurality of flow control devices to selected ones of the manifolds according to the clearance information. A system and a method are also provided.

19 Claims, 5 Drawing Sheets

APPARATUS AND METHOD FOR REDUCING ECCENTRICITY AND OUT-OF-ROUNDNESS IN TURBINES

CROSS REFERENCE TO RELATED APPLICATION

The subject matter disclosed herein is generally related to U.S. patent application Ser. No. 11/548,791, entitled "Turbine Case Impingement Cooling for Heavy Duty Gas Turbines," filed Oct. 12, 2006.

BACKGROUND OF THE INVENTION

1. Field of the Invention

The teachings herein relate to reducing eccentricity and out-of-roundness in a turbine, and, in particular, to techniques for controlling cooling.

2. Description of the Related Art

Air impingement cooling has been used to manage the casing temperature of small gas turbines and to reduce and maintain the clearances between rotating blades and accompanying interior casing surfaces. One problem for air impingement cooling systems on gas turbines is the ability to achieve a uniform heat transfer coefficient across large non-uniform non-standard casing surfaces. On small gas turbines, small impingement holes and short nozzle to surface distances are normally applied. These factors produce the required higher heat transfer coefficients on the casing. One detrimental impact of applying small impingement cooling holes is the need for operating with high differential pressure drop across the holes. This results in the requirement for undesirable high cooling air supply pressures which negatively impacts net efficiency.

Impingement cooling has been applied to aircraft engines as a method of turbine clearance control. However, the impingement systems used on aircraft engines cannot be used in some turbine applications. The systems applied to aircraft engines use air extracted from the compressor as the cooling medium. It is not feasible to use compressor extraction air on some other gas turbines because the design heat transfer coefficients require cooler air temperatures. For example, some other gas turbines have a significantly larger, non-uniform casing surface that requires an intricate manifold design as compared to aircraft engines. Also, the casing thickness and casing thickness variations are considerably greater on such gas turbines.

A problem with eccentricity and out-of-roundness for the gas turbine casing is rub between the rotor and the stator and other mechanical problems. This decreases efficiency of the power output. The problem is primarily addressed by increasing the cold built clearance of the gas turbines, which does not address the problem, but further lowers the efficiency.

Some apparatus are known that provide cooling with impingement air. For example, one system includes an impingement cooling manifold affixed to a casing of the turbine, wherein the impingement cooling manifold includes a plurality of impingement holes in the surface of the impingement cooling manifold; and a blower that provides air flow across the plurality of impingement holes of the impingement cooling manifold to cool the casing of the turbine to control the clearance between a tip of a turbine blade and a shroud of the turbine. While such a system has certain advantages, it is desirable to provide greater control over cooling to further improve performance.

Thus, there is a need for an impingement cooling system that can provide clearance control on gas turbines. Preferably, this system delivers the required heat transfer coefficient to the targeted casing surface, and provides a high degree of control over the flow of air to the casing. Such a system is disclosed herein.

BRIEF DESCRIPTION OF THE INVENTION

In one embodiment, a gas turbine is disclosed and includes: a plurality of turbine blades arranged within a casing, the arrangement including a clearance between tips of the blades and the casing; a plurality of manifolds disposed proximate to the casing opposite the clearance, wherein each of the manifolds includes a plurality of impingement holes in the surface thereof; a source of clearance information; and a source of cooling air for supplying cooling air through a plurality of flow control devices to selected ones of the manifolds according to the clearance information.

In another embodiment, a flow regulated impingement air cooling system for a gas turbine engine, is disclosed and includes: a plurality of manifolds for being disposed proximate to a casing of the gas turbine and opposite to a clearance between tips of turbine blades therein, wherein each of the manifolds includes a plurality of impingement holes in the surface thereof; at least one clearance measuring device for providing clearance information; a plurality of flow control devices for controlling air cooling flow to the plurality of manifolds; and a source of cooling air for supplying cooling air through the plurality of flow control devices to selected ones of the manifolds according to the clearance information.

In a further embodiment, a method for controlling clearance between tips of turbine blades and a casing of a gas turbine, is disclosed and includes: receiving clearance information; determining an amount of cooling air to be supplied to sections of the casing; and regulating flow from a source of cooling air to each section of the casing to reduce the clearance.

BRIEF DESCRIPTION OF THE DRAWINGS

Referring now to the drawings wherein like elements are numbered alike in the several Figures, wherein.

DETAILED DESCRIPTION OF THE INVENTION

Disclosed are methods and apparatus for active clearance control using cooling manifolds in a gas turbine engine. The cooling flow of each individual manifold is regulated by devices such as tuning valves or orifices. Clearance control makes use of information of overall eccentricity and out-of-roundness and local clearance in sectors. The information may be collected in a variety of ways, including with the use of clearance probes. Prior to discussing the methods and apparatus in greater detail, certain aspects of a gas turbine are discussed for perspective.

Figure 1:
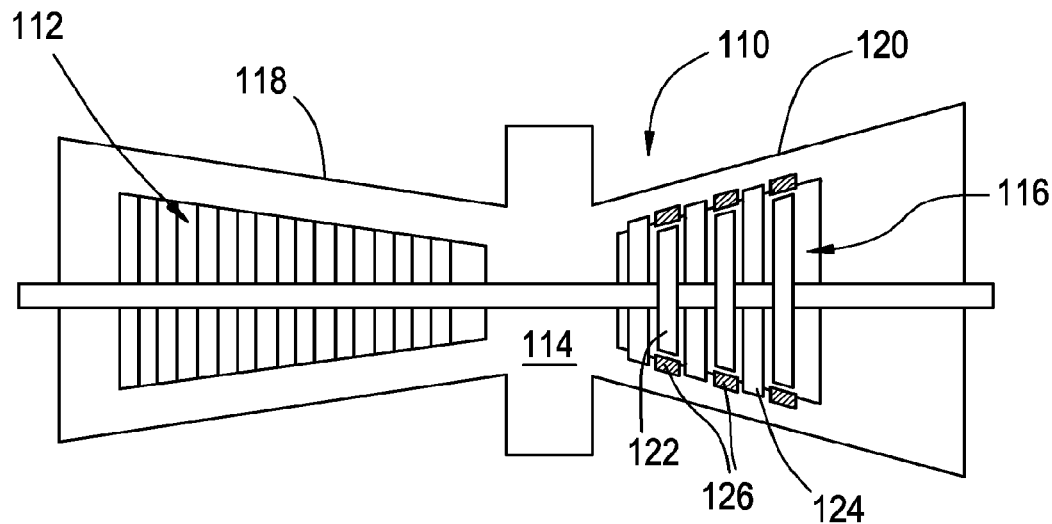
FIG. 1 depicts aspects of a cross-sectional view of a heavy duty gas turbine.

Turning now to FIG. 1, there is illustrated therein an exemplary embodiment of a gas turbine 110. The gas turbine 110 includes a compressor section 112, a combustor section 114 and a turbine section 116. The gas turbine 110 also includes a compressor casing 118 and a turbine casing 120. The turbine casing 118 and the compressor casing 120 enclose major parts of the gas turbine 110. The turbine section 116 includes a shaft and a plurality of sets of rotating and stationary turbine blades 122.

Figure 2:
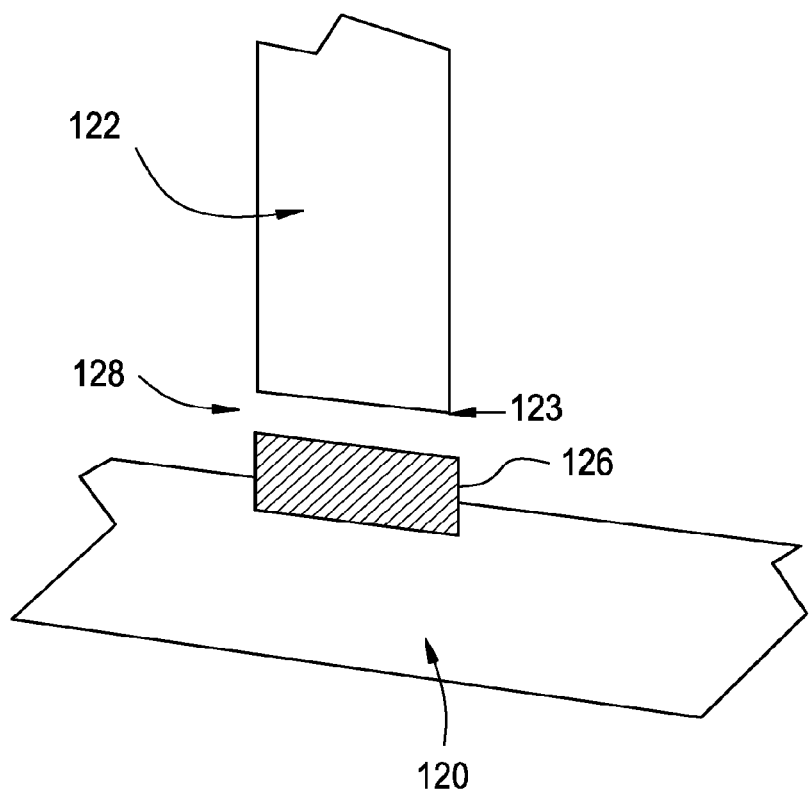
FIG. 2 depicts aspects of a close-up view of the turbine blade to shroud clearance.
Figure 3:
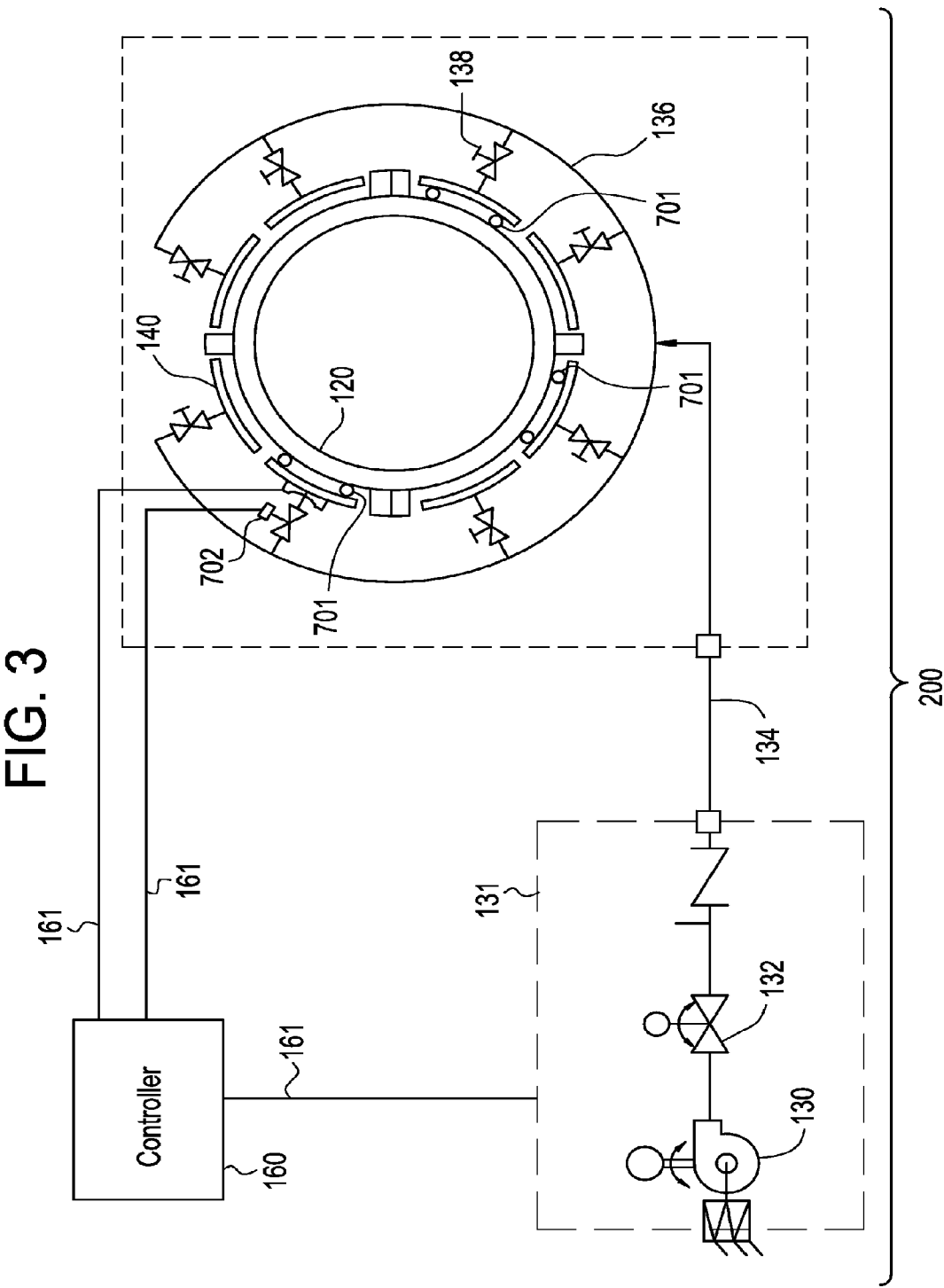
FIG. 3 depicts aspects of an impingement cooling system.

Referring also to FIGS. 2 and 3, the turbine casing 120 may include a shroud 126 affixed to an interior surface of the casing 120. The shroud 126 may be positioned proximate to tips 123 of the rotating turbine blades 122 to minimize air leakage past the tip 123. The distance between the tip 123 of the blade 122 and the shroud 126 is referred to as the clearance 128. It is noted that the clearances 128 of each turbine stage are not consistent due to the different thermal growth characteristics of the blades 122 and casing 120.

A key contributor in the efficiency of gas turbines is the amount of air and exhaust gas leakage through a clearance 128 between the blade tip 123 and the casing 120 or shroud 126 (as shown in FIG. 2). Due to the different thermal growth characteristics of the turbine blades 122 and turbine casing 120, clearances 128 may significantly change as the turbine 110 transitions through transients from ignition to a base-load steady state condition. A clearance control system, including its operating sequence may be implemented to address the specific clearance characteristics during operating conditions. Incorrect design and/or sequencing of the control system may lead to excessive rubbing of the tips 123 with respective casing shrouds 126, which can result in increased dimensions for clearances 128 and reduced performance.

As illustrated in the exemplary embodiment of FIG. 3, a flow regulated impingement air cooling system 200 may be used to reduce and maintain a desired clearance 128 between the turbine shroud 126 and the respective set of blade tips 123. Referring to FIG. 3, the flow regulated impingement air cooling system 200 includes a source of cooling air 131. The source of cooling air 131 may include, for example, a compressor 112 (FIG. 1), and/or the illustrated blower 130 and flow control damper 132. The source of cooling air 131 may further include electro-mechanical components for providing an interface and operating with control components, such as controller 160.

Further included in the flow regulated impingement air cooling system 200 are interconnect piping 134, a distribution header 136, flow metering valves or orifices 138 and a series impingement cooling manifolds 140. Each of the impingement cooling manifolds 140 may be affixed to the turbine casing 120. In the exemplary embodiment of FIG. 3, a plurality of impingement manifolds 140 are affixed about the circumference of the turbine casing 120. The impingement cooling blower 130 takes suction from ambient air and blows the air through the flow control damper 132, interconnect piping 134, distribution header 136, flow metering valves or orifices 138 and into the impingement cooling manifolds 140. The blower 130 may be any blowing device including a compressor, a fan or a jet. The impingement cooling manifold 140 insures a uniform heat transfer coefficient is delivered to the turbine casing 120. It should be appreciated that the flow regulated impingement air cooling system 200 is not limited to the components disclosed herein but may include any components that enables air to pass along the impingement cooling manifolds 140.

Further shown in FIG. 3 are aspects of control components. In the embodiment depicted, included with the control components are the controller 160 and control lines 161. The control lines 161 provide for communication between the controller 161 and a plurality of clearance probes 701 (only a portion of which are illustrated in FIG. 3). The clearance probes 701 communicate clearance information to the controller 160 via the communication lines 161. The controller 160 males use of the clearance information to generate instructions and provide commands to a plurality of flow regulators 702. Although only one of the flow regulators 702 in FIG. 3 is illustrated as receiving a signal from the controller 160 in response to a signal from one of the clearance probes 701, other flow regulators 702 may be similarly controlled in response to signals from one or more of the probes 701 and/or other data. For example, the flow regulators 702 may be in the form of control valves and/or secondary equipment such as positioners, transformers, regulators, actuators, manual operators, snubbers, limit switches and other such devices. The flow regulators 702 adjust the flow metering valves 138 according to the instructions. Thus, a flow of cooling air for each manifold 140 is separately regulated, and cooling of the casing 120 is accomplished in sections (where each section generally corresponds to a manifold 140).

The controller 160 may be implemented in any mechanical, electrical and or optical form, including in the form of conventional P-I-D control and/or computer control with a computer program. The computer program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the certain embodiments of the present invention includes embodying the functionality of the preferred embodiments of the present invention in logic embodied in hardware or software-configured mediums.

As may be surmised, the flow regulated impingement air cooling system 200 may include a variety of components generally used for signal collection, processing and component control. These include at least one of a processor, a memory, a storage, a power supply, a set of machine readable instructions stored on machine readable media (i.e., software), a wire, a cable, an optical fiber, a connection, a couplings, an interface (including wireless implementations) and other such components. Accordingly, embodiments of the flow regulated impingement air cooling system 200 include software for receiving clearance information and controlling each of the flow regulators 702. The controlling may be performed on a real time basis (that is, as quickly as desired by a user or designer for production of clearance control during operation of the turbine 110). Other input data besides clearance information may also be used, including local casing temperature, vibration data and other process parameters.

A technical effect is that the flow regulated impingement air cooling system 200 may include machine executable instructions stored on machine readable media, where the instructions provide for operation of the flow regulated impingement air cooling system 200 and components thereof.

Figure 4:
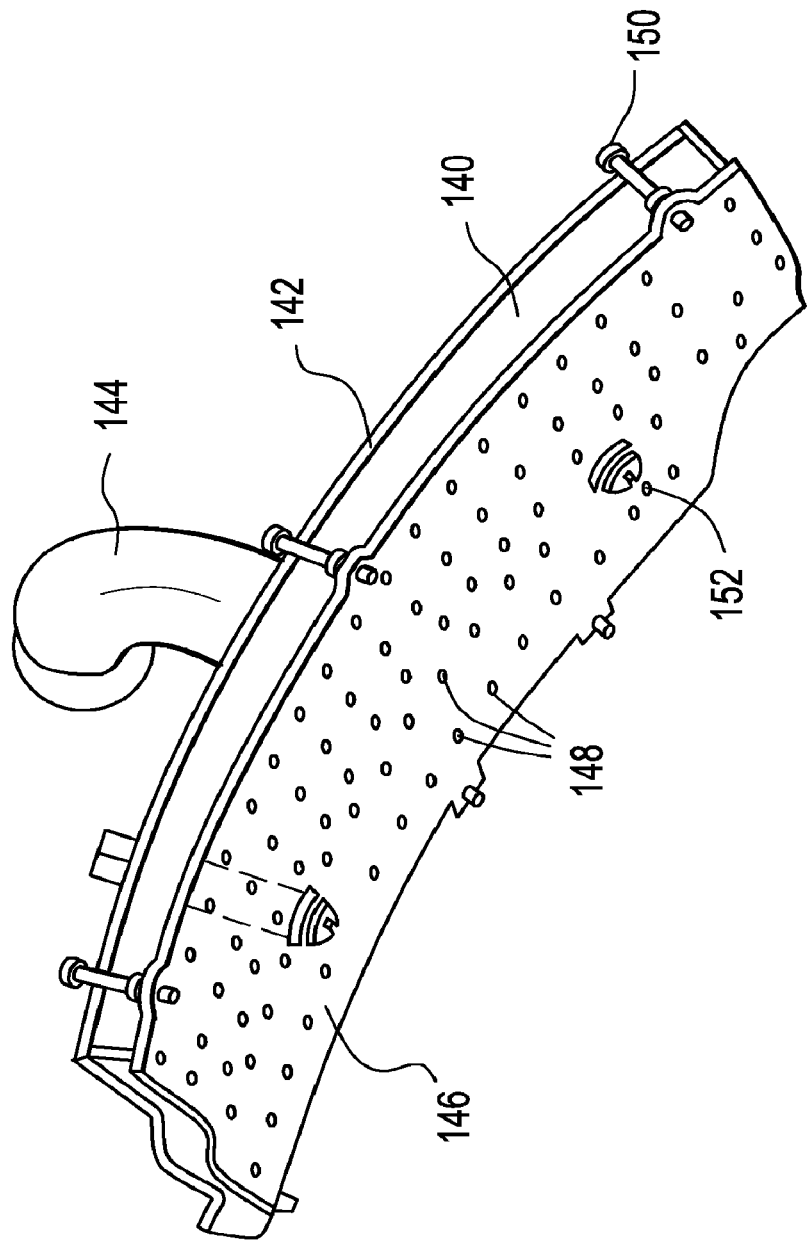
FIG. 4 is an orthographic view of a impingement cooling manifold.
Figure 5:
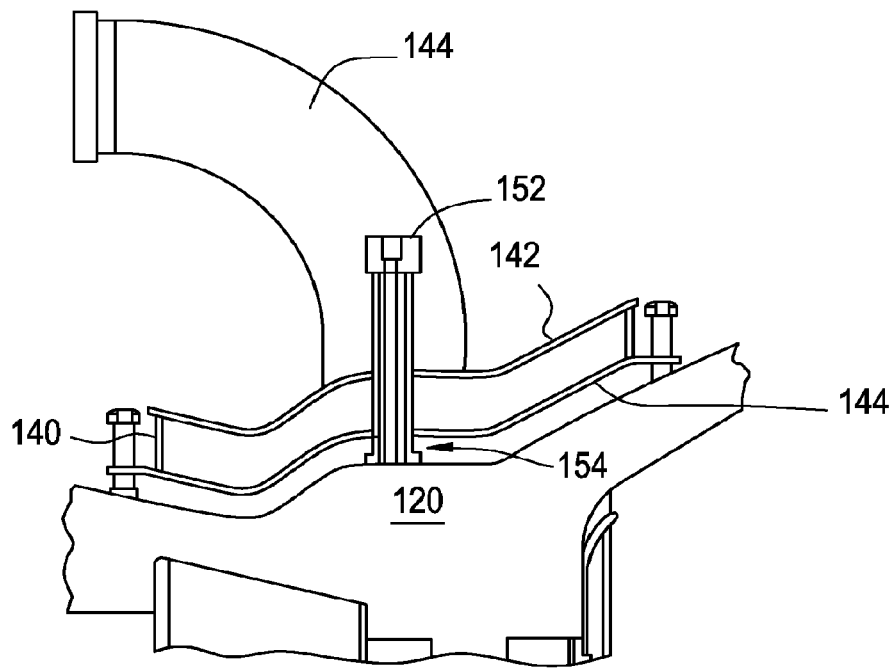
FIG. 5 is a cross-section view of an impingement cooling manifold.

Referring to exemplary embodiment illustrated in FIGS. 4 and 5, the impingement cooling manifolds 140 may be designed to the contours of the target area of the turbine casing 120. Each impingement cooling manifold 140 may include an upper plate 142 with feed pipe 144, a lower plate 146 with multiple impingement holes 148, side pieces 154, support legs 150 and hold-down supports 152. The impingement holes 148 permit air to flow from the impingement cooling manifold 140 to the turbine casing 120 to selectively cool the turbine casing 120.

The impingement holes 148 are generally positioned in an array. In an exemplary embodiment, the impingement holes 148 may be spaced in the range from about 1.25 inches to about 2.5 inches. In an exemplary embodiment, the individual impingement holes 148 may be sized between about 0.12 inches and about 0.2 inches. The varying hole sizes and spacing are required to compensate for the non-uniformity of the turbine casing geometry. The size and positioning of the impingement holes 148 on the lower plate 146 produce a uniform heat transfer coefficient across the casing targeted by the flow regulated impingement air cooling system 700. However, the impingement holes are not limited to these sizes or spacings. The distance between the upper 142 and lower plates 146 also may be dimensioned to minimize internal pressure variations, which results in uniform cooling hole pressure ratios.

The gap distance between impingement cooling manifold lower plates 146 and the turbine casing 120 effects the heat transfer coefficient. Too large of a gap can result in a non-optimum heat transfer coefficient. Too little of a gap can result in both non-optimum and a non-uniform heat transfer coefficient. In an exemplary embodiment, a gap of between about 0.5 inch and about 1.0 inch provides a suitable heat transfer coefficient. However, the gap in not limited to this range and may be any distance that provides a suitable heat transfer coefficient.

Figure 6:
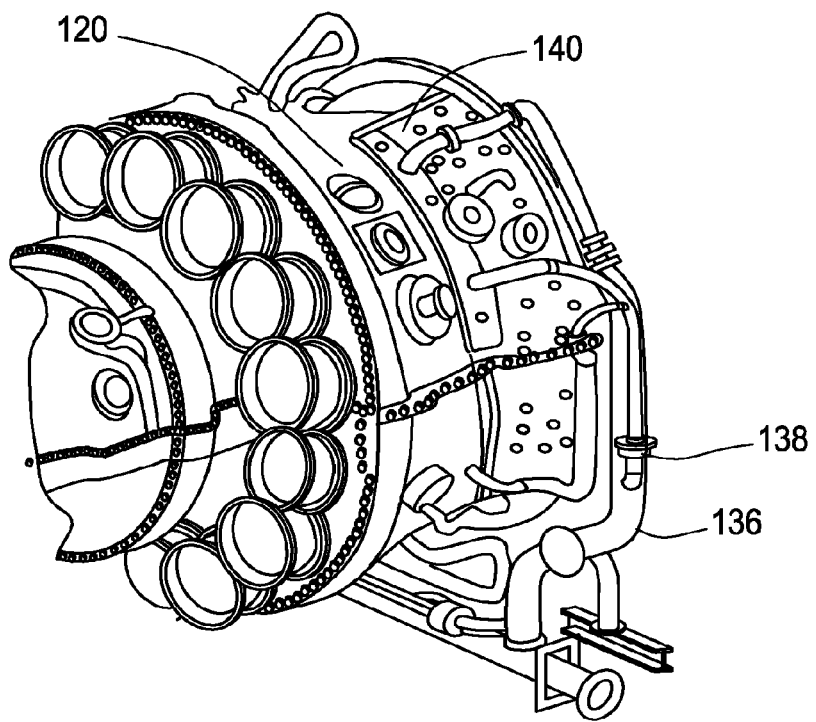
FIG. 6 is an orthographic view of installed impingement cooling manifolds on a turbine casing.

As illustrated in FIG. 6, the multiple impingement cooling manifolds 140 are affixed to the casing 120 of the turbine directly above target cooling area (i.e., opposite to the clearance 128). The impingement cooling manifolds 140 are positioned such that there is ample spacing between their edges and any protrusions off of the casing. This provides a free path for the air passing through the impingement holes 148 to exhaust from under the impingement cooling manifold 140 to the environment. In an exemplary embodiment, the spacing between two adjacent impingement cooling manifolds 140 may be between about 1 inch to about 30 inches and is dependent on casing protrusions and flanged joints. The spacing is not limited to these dimensions and may be spaced at any suitable distance. The impingement cooling manifolds 140 also may provide impingement cooling to any of the axial flanges, including the horizontal split joint.

Figure 7:
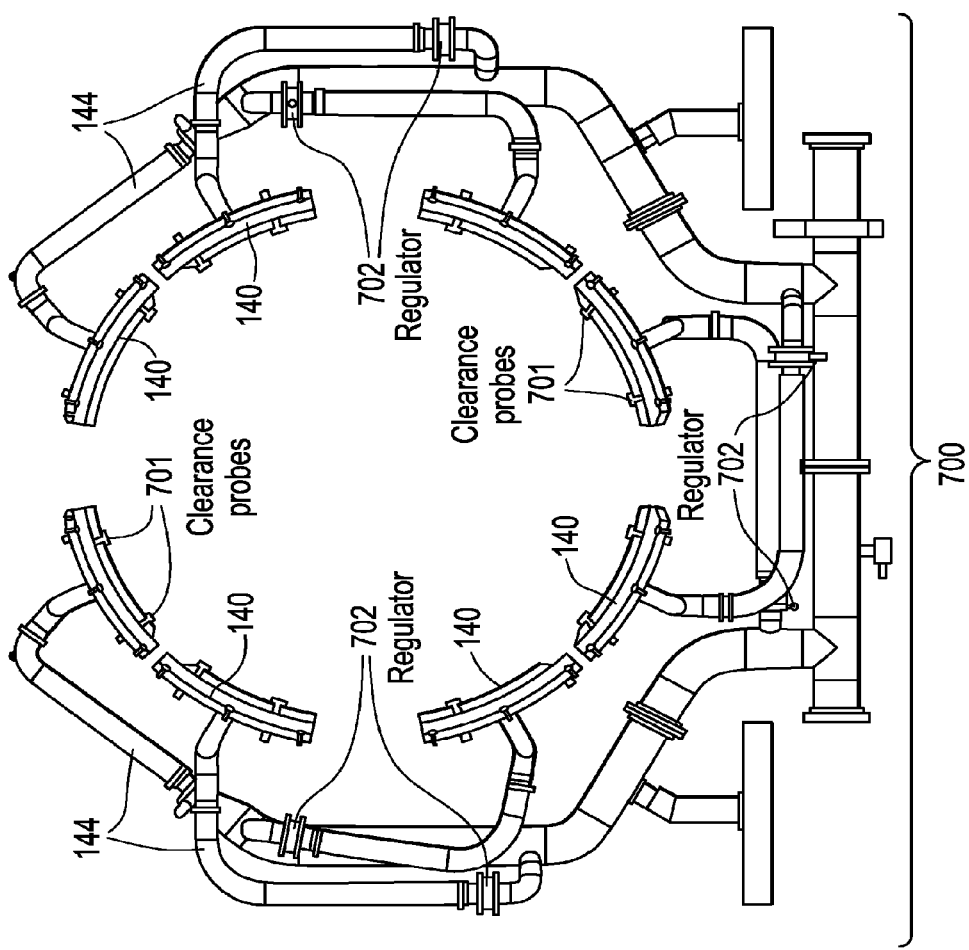
FIG. 7 depicts aspects of the impingement cooling system including clearance probes and regulators.

Now with reference to FIG. 7, another embodiment of the flow regulated impingement air cooling system 700 is shown. In FIG. 7, the flow regulated impingement air cooling system 700 includes devices for measuring clearance during operation (i.e., online measurement). In this embodiment, the devices for measuring clearance include the plurality of clearance probes 701. Exemplary embodiments of clearance probes 701 include probes operating by use of at least one of mechanical, electrical, electromechanical, magnetic, electromagnetic, optical as well as other technologies. The clearance probes 701 are generally evenly distributed to provide for sensing aspects of the clearance 128, such as by determining proximity of the turbine casing 120. The devices for measuring clearance provide clearance information for each of the impingement cooling manifolds 140.

Also included in the flow regulated impingement air cooling system 700 is a plurality of flow control devices. In the embodiment depicted, the flow control devices include flow regulators 702. Each of the flow regulators 702 is adapted for regulating flow of cooling air from the feed pipe 144 to the respective impingement cooling manifold 140. By use of the flow regulators 702, it is thus possible to finely regulate flow of cooling air to selected portions of the turbine casing 120.

In another embodiment of the flow regulated impingement air cooling system 700, the amount of cooling needed for each of the impingement cooling manifolds 140 may be known. This may be the case when the pattern of eccentricity and out-of-roundness is known (as may be the case for some gas turbines 110). Accordingly, in this embodiment, the devices for measuring clearance are not directly incorporated into the gas turbine 110. That is, for example, the devices for measuring clearance (i.e., a source of clearance information) may include devices used for performing measurements during design, assembly or maintenance (i.e., offline measurement). Non limiting examples include optical devices (for example, an optical sensing system), radiofrequency devices (for example, a microwave sensing system), magnetic devices (for example, a magnetic sensing system), and mechanical devices such as micrometers, calipers, feeler gauges and digital or analog embodiments thereof.

Further, the flow control devices may be a plurality of appropriately sized orifices, instead of or in addition to the flow regulators 702. As used herein, the term "orifice" makes reference to a flow restriction exhibiting predetermined properties for restricting flow to a desired amount.

Further, in some instances, software may be included which provides for adjusting flow configurations based upon operational conditions.

Accordingly, advantages over prior solutions to the problem of eccentricity and out-of-roundness, primarily addressed by increasing the cold built clearance of the gas turbines, are provided. The advantages include reduced possibility of rubbing as well as increased efficiency.

In some embodiment, the flow regulated impingement air cooling system 700 is provided as a kit. For example, the flow regulated impingement air cooling system 700 can be provided as a retro-fit option for an existing gas turbine. In some instances, the retro-fit kit includes, as a non-limiting example, clearance measuring devices for measuring clearance during operation (such as the clearance probes 701 discussed above), flow control devices for controlling air cooling flow during operation (such as the flow regulators 702 discussed above), a plurality of impingement cooling manifolds 140, and the source of cooling air 131. Other equipment as necessary may be included. For example, the kit may include processing components, such as a controller, a processor, storage, memory, a communications component, an interface, an electromechanical unit (such as servos for operating the flow regulators 702) and machine executable instructions stored on machine readable media, where the instructions provide for governing operation of the flow regulated impingement air cooling system 700.

Although the technology described herein has been exemplified with respect to a gas turbine, it may also be used in connection with a wide variety of other turbine machinery including oil, coal-fired, steam and other types of turbines and compressors.

While the invention has been described with reference to an exemplary embodiment, it will be understood that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A turbine comprising:
    a plurality of turbine blades arranged within a casing;
    a plurality of manifolds disposed proximate to the casing opposite the turbine blades and separated from the casing by a clearance, wherein each of the manifolds comprises a plurality of impingement holes in the surface thereof;
    a device configured to provide information related to the clearance; and
    a source of cooling air configured to supply cooling air through a plurality of flow control devices to selected ones of the manifolds according to the information related to the clearance.

2. The turbine as in claim 1, wherein the clearance measuring device configured to provide one of online measurement and offline measurement of the clearance.

3. The turbine as in claim 2, wherein offline measurement is performed during one of design, assembly and maintenance.

4. The turbine as in claim 1, wherein the clearance measuring device comprises a plurality of clearance probes.

5. The turbine as in claim 1, wherein the clearance measuring device comprises at least one of an optical device, a radiofrequency device, a magnetic device and a mechanical device.

6. The turbine as in claim 1, wherein at least one flow control device comprises a flow regulator.

7. The turbine as in claim 1, wherein at least one flow control device comprises an orifice.

8. The turbine as in claim 1, further comprising a controller configured to receive the clearance information during operation of the gas turbine and regulating flow through each of the flow control devices.

9. A flow regulated impingement air cooling system for a turbine, the system comprising:
    a plurality of manifolds configured to be disposed proximate to a casing of the gas turbine and opposite turbine blades therein and separated from the casing by a clearance, wherein each of the manifolds comprises a plurality of impingement holes in the surface thereof;
    at least one clearance measuring device configured to provide information related to the clearance;
    a plurality of flow control devices configured to control air cooling flow to the plurality of manifolds; and
    a source of cooling air configured to supply cooling air through the plurality of flow control devices to selected ones of the manifolds according to the information related to the clearance.

10. The system as in claim 9, further comprising processing components configured to govern operation of the system.

11. The system as in claim 10, wherein the processing components comprise at least one of: a controller, a processor, storage, a memory, a communications component, an interface, an electromechanical unit and machine executable instructions stored on machine readable media.

12. The system as in claim 9, wherein the at least one clearance measuring device comprises at least one of an optical device, a radiofrequency device, a magnetic device and a mechanical device.

13. The system as in claim 9, wherein at least one flow control device comprises a flow regulator.

14. The system as in claim 9, wherein at least one flow control device comprises an orifice.

15. The system as in claim 9, wherein the system is adapted for retrofit of an existing turbine.

16. A method for controlling a distance between tips of turbine blades and a casing of a turbine, the method comprising:
    receiving information related to a clearance between the casing and a manifold proximate the casing and opposite the turbine blades;
    determining an amount of cooling air to be supplied to sections of the casing from the information related to the clearance; and
    regulating flow from a source of cooling air to each section of the casing according to the information related to the clearance to control the distance.

17. The method as in claim 16, wherein at least one of the receiving and the regulating is performed on a real time basis.

18. The method as in claim 16, wherein regulating comprises reducing eccentricity in the turbine.

19. The method as in claim 16, wherein regulating comprises reducing out-of-roundness in the turbine.

* * * * *